Figure 3:
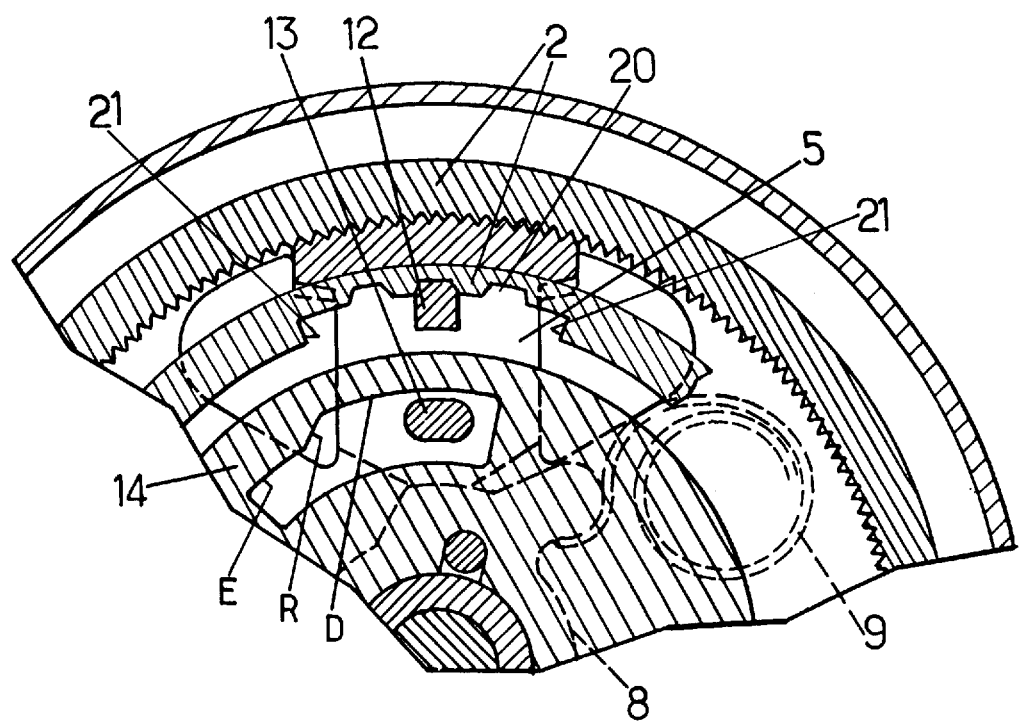

United States Patent [19]
Rohee

[11] Patent Number: 5,820,219
[45] Date of Patent: Oct. 13, 1998

[54] ADJUSTABLE HINGE FOR A SEAT BACK

[75] Inventor: René Rohee, La Chapelle-Biche, France

[73] Assignee: Bertrand Faure Equipements SA, Boulogne, France

[21] Appl. No.: 859,244

[22] Filed: May 20, 1997

[30] Foreign Application Priority Data

May 21, 1996 [FR] France ................................. 96 06279

[51] Int. Cl.⁶ ........................................................ B60N 2/22
[52] U.S. Cl. ............................................................ 297/367
[58] Field of Search .................................... 297/363–367, 297/362, 378.12

[56] References Cited

U.S. PATENT DOCUMENTS

| | | | |
|---|---|---|---|
| 4,082,352 | 4/1978 | Bales et al. | 297/364 |
| 4,384,743 | 5/1983 | Barley | 297/355 |
| 4,758,046 | 7/1988 | Cousin et al. | 297/367 X |
| 5,161,856 | 11/1992 | Nishino | 297/367 |
| 5,590,931 | 1/1997 | Fourrey et al. | 297/367 X |
| 5,611,599 | 3/1997 | Baloche et al. | 297/367 |

FOREIGN PATENT DOCUMENTS 0 502 774 A1  9/1992  European Pat. Off. .
2494574  5/1982  France ................................. 297/367

Primary Examiner—Peter R. Brown
Attorney, Agent, or Firm—Marshall, O'Toole, Gerstein, Murray & Borun

[57] ABSTRACT

Within a housing 4, the hinge includes a fixed cheek plate 1 and a moving cheek plate 2, one secured to the seat proper and the other secured to the seat back. Slugs 5 are mounted to move radially in grooves 7 of the stationary cheek plate and can hold the hinge in position by their outwardly directed sets of teeth 6 engaging in an inwardly directed set of teeth 3 of the moving cheek plate. The user can move the slugs by means of a lever and a central cam 8. The moving cheek plate 2 includes a set of notches 20 concentric with the set of teeth 3 and having a notch pitch that is equal to a multiple of the locking pitch of the set of teeth 3; at least one of the slugs 5 has a tooth 12 suitable for engaging in the set of notches 20 so as to enable the outwardly directed set of teeth 6 of the slug 5 to mesh in the inwardly directed set of teeth 3 of the second cheek plate 2, thereby obtaining a notch pitch that is considerably greater than the locking pitch. The hinge is applicable to adjusting the inclination of the seat back of the back seat of a car.

2 Claims, 2 Drawing Sheets

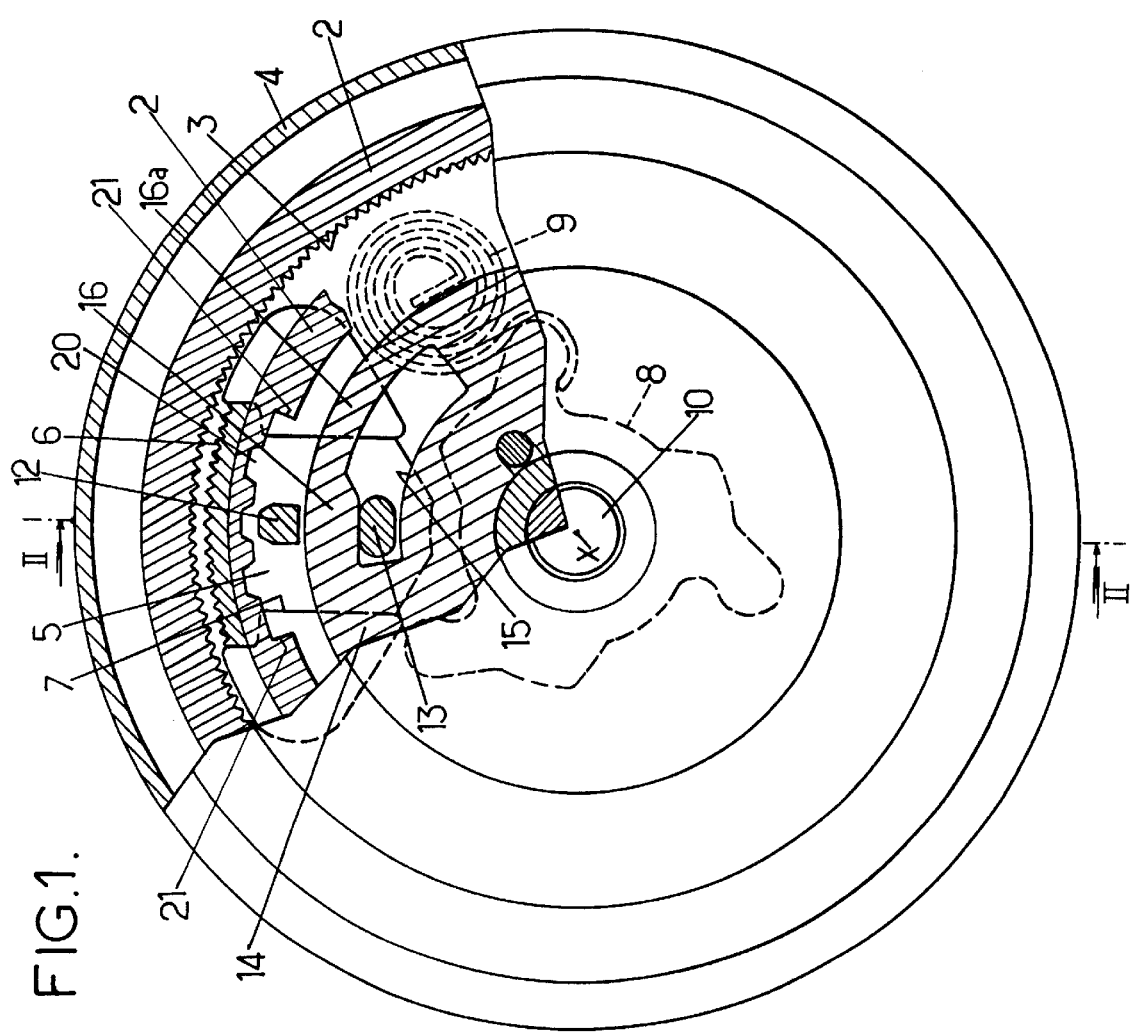
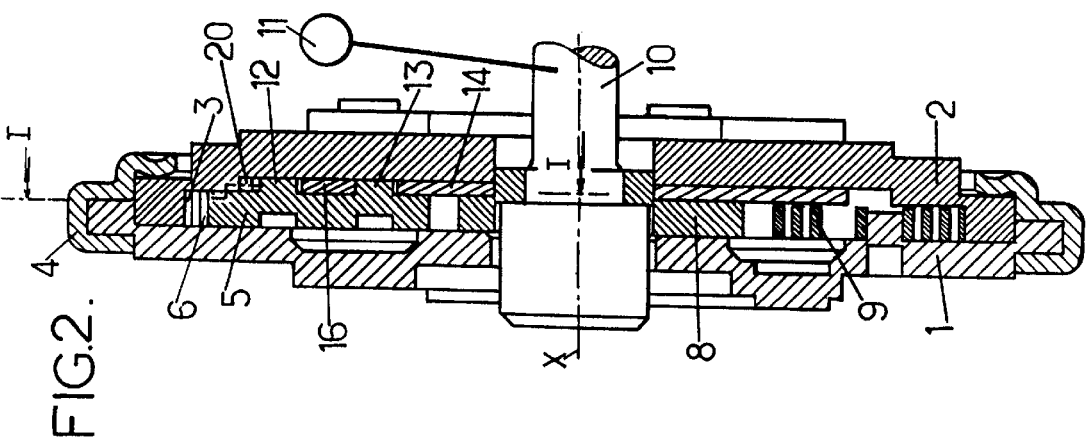

ADJUSTABLE HINGE FOR A SEAT BACK

The present invention relates to a hinge for a vehicle seat, the hinge enabling the inclination of the seat back to be adjusted relative to the seat proper about a horizontal axis, the hinge comprising: a first cheek plate and a second cheek plate designed to be secured respectively to the seat proper and to the seat back, and mounted to each other to form a closed housing and to pivot relative to each other about the axis, the second cheek plate being secured to a set of teeth having a small locking pitch, which set of teeth extends over at least an arc of a circle centered on the axis and being directed radially inwards; at least one slug inside the housing and provided with outwardly-directed teeth suitable for meshing with the teeth of the second cheek plate, said slug being guided by a guide secured to the first cheek plate to slide in a radial direction between a locking position in which the slug co-operates with the teeth of the second cheek plate, thereby holding the hinge, and an unlocking position in which it is disengaged form the teeth of the second cheek plate; a cam inside the housing and mounted to rotate about the axis to control radial sliding of the slug, said cam being urged by resilient means towards an angular rest position in which it urges the slug into its locking position; and a control member accessible to a person sitting on the seat to displace the cam from its rest position to a working position in which it allows the slug to slide radially towards its disengaged position.

A hinge of this type is described, for example, in French patent application No. 95 12723, filed Oct. 27, 1995 in the name of the Applicant, in particular in application to adjusting the inclination of the back of a vehicle front seat.

In hinges of this type, the "locking pitch" referred to above is relatively small, of the order of 3°, in order to ensure that the teeth on the second cheek plate have sufficient mechanical strength.

Unfortunately, it can sometimes be preferable, e.g. when adjusting the inclination of the back of a vehicle back seat, to obtain an adjustment pitch for the inclination of the back, referred to below as the "catching pitch", that is considerably greater than the locking pitch, which must remain relatively small. In which case the catching pitch is a multiple of the locking pitch.

The object of the invention is to solve this problem in the simplest and cheapest manner possible, and to this end, a hinge of the general type defined above is characterized in that said second cheek plate includes a set of notches disposed concentrically with said set of teeth, directed radially inwards, and having a notch pitch equal to a multiple of said locking pitch of the teeth, and in that at least one of said slugs includes a tooth suitable for meshing in said set of notches to enable the outwardly directed set of teeth of said slug to mesh in the inwardly directed set of teeth of said second cheek plate.

Like the hinge described in the above-referenced French patent application, the present hinge may include a plurality of slugs, e.g. three slugs at 120° angular intervals, with each slug carrying a tooth suitable for co-operating with the notches of the second cheek plate.

The operation of a hinge of the invention, together with dispositions associated therewith, are described below as non-limiting examples, with reference to the figures of the accompanying drawings, in which:

FIG. 1 is a side view of a car seat hinge of the invention, partially cutaway on a plane I—I defined in the section of FIG. 2, where FIG. 2 is a cross-section view on line II—II of FIG. 1, the hinge being shown in its unlocked position enabling the seat hinge to be adjusted; and FIG. 3 is a view analogous to FIG. 1, showing the locked position of the hinge.

The known portion of the hinge comprises the following elements:

a "stationary" first cheek plate 1 which is suitable for being secured to the structure of the seat proper of the seat;

a "moving" second cheek plate 2 secured to the structure of the seat back and capable of pivoting about the horizontal axis of rotation X of the seat back, the stationary and moving cheek plates together forming a round housing, and the moving cheek plate including a circular set of teeth 3 extending radially inwards and disposed inside the housing;

a sheet metal ring 4 crimped around the periphery of the stationary cheek plate 1 and partially overlapping the moving cheek plate 2 so as to close the housing and hold the peripheries of the two cheek plates one against the other;

three metal slugs 5, each provided with its own outwardly directed teeth 6 suitable for co-operating with the inwardly directed teeth 3 of the moving cheek plate, the three slugs being guided to slide radially in guide grooves 7 formed in the stationary cheek plate, the sliding directions of the three slugs being mutually offset by 120° about the axis X;

a cam 8 rotatable about the axis X and acting on all three slugs 5, said cam being angularly displaceable between a rest position in which it urges the slugs towards a locking position so that their outwardly directed teeth 5 co-operate with the inwardly directed teeth 3 of the moving cheek plate, thereby holding said moving cheek plate in place, and a working or unlocking position in which said cam enables the slugs 5 to reverse towards a retracted position in which their outwardly teeth are separated from the inwardly directed teeth of the moving cheek plate;

three springs 9 constituted in this case by spiral-wound blades urging the cam 8 towards its rest angular position corresponding to the hinge being locked (only one such spring being shown in FIG. 1, for simplification purposes); and a shaft 10 on the axis X and secured to the cam 8, and also being secured to a control member such as a handle accessible to the person sitting on the seat and represented highly diagrammatically at 11 in FIG. 2.

In addition, dispositions are provided enabling the slugs 5 to be maintained in the unlocked position when the central cam 8 is in a position other than its position that serves to lock the slugs. Any appropriate means can be used for this purpose, for example springs continuously urging the slugs radially inwards, however as already explained in the earlier application, that can give rise to certain drawbacks. It is preferable to use positive unlocking means, even though that is not essential in the context of the present invention. To this end, as in the present application, it is possible although optional to provide for the hinge further to include:

on each slug 5 a peg 13 projecting from the slug in the direction of the X axis; and a thin plate 14 hollowed out by slots 15 each having one of the pegs 13 passing therethrough. Said plate being secured to the cam 8.

Each slot 15 is circumferentially elongate around the axis X and its edge furthest from said axis has a step so that it comprises two circular arcs D and E of different diameters interconnected by an oblique ramp R (see FIG. 3).

The diameters of the arcs D and E are determined such that:

when the larger diameter arc D is radially in register with the corresponding peg 13, the peg is free to travel over its entire radial stroke (see FIG. 3); and on the contrary, when the smaller diameter arc E is in register with the peg, this arc is pressed radially against the peg and holds it in its position closest to the axis and corresponding to the hinge being unlocked (see FIG. 1).

Because the ramp R is oblique, mere rotation of the plate 14 makes it possible, by sliding the peg 12 over the ramp, to displace the peg positively into its disengaged unlocking position.

Naturally, in order to ensure that each slug should be capable of moving over its full radial stroke, it is appropriate for the perforated plate 14 to include, in association with the peg 13 of each slug, a bridge 16 that includes a portion 16a that is sufficiently narrow.

It should be observed that the perforated plate is received inside the closed housing defined by the cheek plates 1 and 2, together with all of the following elements: the inwardly directed teeth 3 of the moving cheek plate 2; the slugs 5 together with their outwardly directed teeth 6; the guides 7; the cam 8; and the springs 9; and it should be observed that all of these parts are automatically juxtaposed without slack so as to slide snugly over one another in a minimum of space merely due to the fact that the sheet metal ring 4 is crimped onto the juxtaposed peripheral annular bearing surfaces of the two cheek plates 1 and 2.

With reference more particularly to the distinctive dispositions of the present invention, notches 20 are provided on the second cheek plate 2 concentrically with the teeth 3 and offset therefrom both radially (towards the axis) and axially. The pitch of the notches 20 is a multiple of the pitch of the teeth 3. Preferably, and as can clearly be seen in FIGS. 1 and 3, the notches 20 are subdivided into three notched arcs in register with each slug 5 and defined, on each side, with appropriate angular spacing, by two radial abutment shoulders 21. Each slug 5 carries a tooth 12 suitable for engaging in the corresponding notched arc 20 to enable its outwardly directed teeth 6 to engage in the inwardly directed teeth 3 of the second cheek plate 2, as can be seen in FIG. 3. The maximum inclination of the seat back can then be limited in both directions, by one or other of the shoulders 21 coming into abutment against the tooth 12.

The hinge operates as follows.

At rest (FIG. 3), the cam 8 is in its angular position where the slugs 5 are in their radial positions furthest from the axis X, with their teeth 6 engaged in the teeth 3 of the moving cheek plate 2: the seat back is thus held stationary. It should be observed that, by means of the present invention, this holding of the seat back can take place only in a number of inclination positions for the back that is more limited than would be allowed solely by co-operation between the sets of teeth 6 and 3, since these sets of teeth can engage mutually only providing there is mutual engagement between the teeth 12 and the corresponding arcs of notches 20, which have a pitch that is considerably greater than the pitch of the teeth 3; that is the intended object.

To change the angular position of the back, the user of the seat acts on the handle 11 against the return forces of the springs 9, thereby giving rise to the following two consequences:

a the radially projecting portions of the cam 8 that were pressed against the slugs 5 to engage them with the toothed ring 6 are moved angularly, thereby making it possible for the slugs to move radially towards the axis X; and such movements are imposed by co-operation between the slots 15 in the plate 14 and the pegs 13.

In other words, "positive" control of the radial disengagement of each set of teeth 6 of a slug 5 away from the set of teeth 3 of the moving cheek plate 2 is thus observed, together with disengagement of each of the teeth 12 of the slugs from the notches 20 of the same cheek plate.

The back is then free to rotate about the axis X relative to the seat proper.

The user of the seat can then change the angular inclination of the back, in particular by pushing to a greater or lesser extent against the seat back in opposition to an appropriate return spring, and when a new desired angular position is obtained, in compliance with the pitch of the notches determined by the set of notches 20, the user can merely let go the handle 11: the resilient return force of the springs 9 then returns the assembly constituted by the cam 8 and the plate 14 secured thereto to its initial angular position corresponding to locking, in which position both the projecting portions of the cam 8 are again pressed radially against the slugs 5 and it is the radially enlarged portions of the slots 15 which coincide with the pegs 13, thereby allowing the slugs to return to their radial positions furthest from the axis.

It should be observed that one of the radial shoulders 21 of each notched arc 20 can be far enough away angularly from the tooth 12 of the corresponding slug to enable the back of the back seat to be tilted down onto the seat proper, which can be advantageous for station wagon or 5-door type vehicles.

I claim:

1. A hinge for a vehicle seat, the hinge enabling the inclination of the seat back to be adjusted relative to the seat proper about a horizontal axis (X), the hinge comprising: a first cheek plate (1) and a second cheek plate (2) designed to be secured respectively to the seat proper and to the seat back, and mounted to each other to form a closed housing and to pivot relative to each other about the axis (x), the second cheek plate being secured to a set of teeth (3) having a small locking pitch, which set of teeth extends over at least an arc of a circle centered on the axis (X) and being directed radially inwards; at least one slug (5) inside the housing and provided with outwardly-directed teeth (6) suitable for meshing with the teeth of the second cheek plate, said slug being guided by a guide (1) secured to the first cheek plate to slide in a radial direction between a locking position in which the slug cooperates with the teeth of the second cheek plate, thereby holding the hinge, and an unlocking position in which it is disengaged from the teeth of the second cheek plate; a cam (8) inside the housing and mounted to rotate about the axis (X) to control radial sliding of the slug, said cam being urged by resilient means (9) towards an angular rest position in which it urges the slug into its locking position; and a control member (11) rotatively connected to said cam (8) and accessible to a person sitting on the seat to displace the cam from its rest position to a working position in which it allows the slug to slide radially towards its disengaged position; the hinge being characterized in that: said second cheek plate (2) includes a set of notches (20) disposed concentrically with said set of teeth (3) directed radially inwards and having a notch pitch equal to a multiple of said locking pitch of the teeth (3); and in that said at least one slug (5) includes a lateral tooth (12) suitable for meshing in said set of notches (20) to enable the outwardly directed set of teeth (6) of said slug (5) to mesh in the inwardly directed set of teeth (3) of said second cheek plate (2).

2. A hinge according to claim 1, characterized in that said set of notches (20) is subdivided into a plurality of notched arcs each around a respective slug (5), said arcs being defined on either side of the corresponding slug by radial shoulders (21) suitable for coming into abutment against said corresponding tooth (12) to limit inclination of the seat back in both directions.

* * * * *